April 9, 1946.　　　R. MUNRO ET AL　　　2,398,032
ELECTRODE HOLDER
Filed July 10, 1944
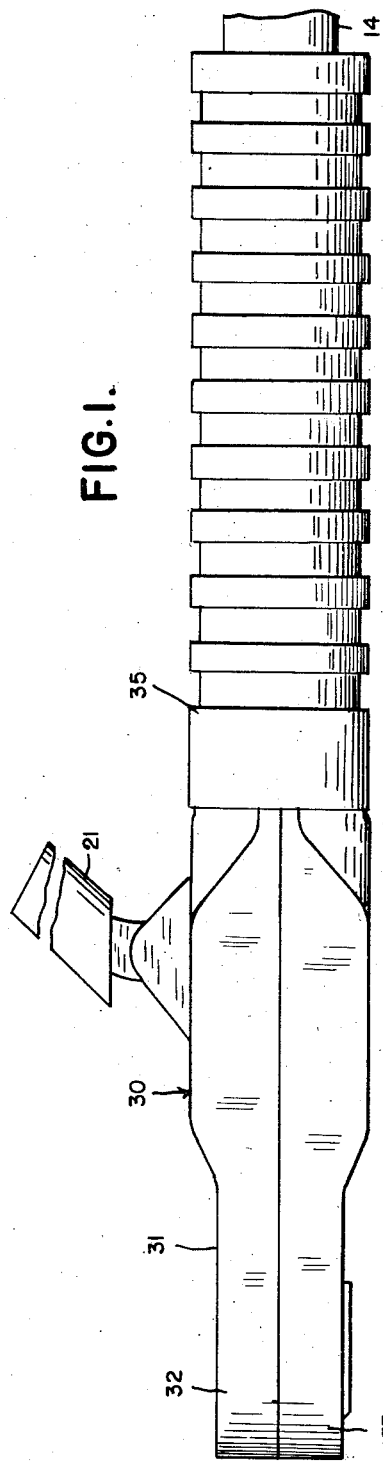
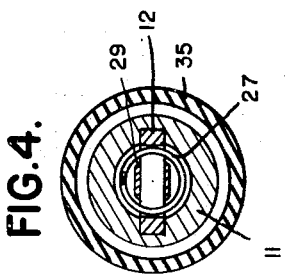
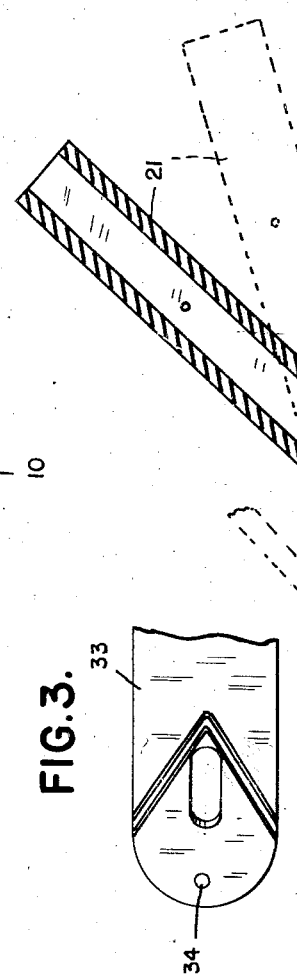
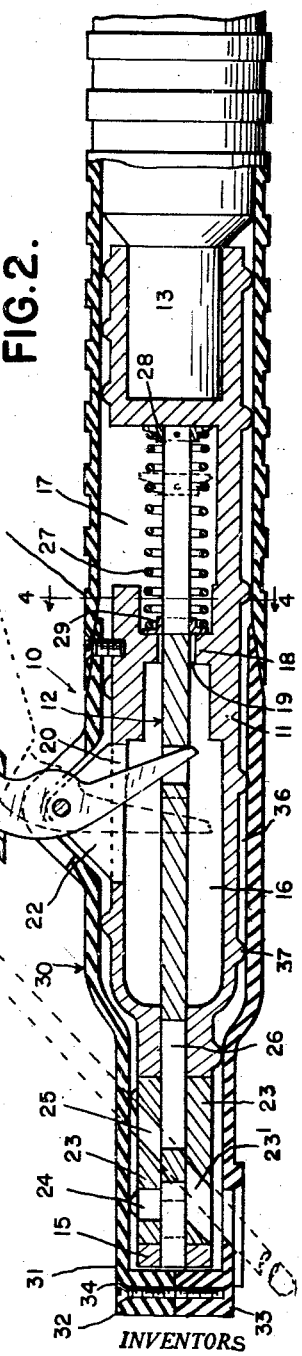
INVENTORS
ROBERT MUNRO
ARTHUR A. ALBRIGHT
BY Whittemore Hulbert & Belknap
ATTORNEYS Patented Apr. 9, 1946

2,398,032

UNITED STATES PATENT OFFICE 2,398,032

ELECTRODE HOLDER

Robert Munro, Grosse Pointe Woods, and Arthur A. Albright, Detroit, Mich.

Application July 10, 1944, Serial No. 544,196

3 Claims. (Cl. 219—8)

This invention relates generally to welding equipment and refers more particularly to improvements in electrode holders of the type used in connection with arc welding equipment.

One of the principal objects of this invention is to provide a relatively simple, inexpensive electrode holder possessing a combination of features which not only insures maximum safety in handling during actual welding operations but, in addition, greatly increases the serviceable life of the holder.

The safety factor of the holder is increased by enclosing the holder in a casing of dielectric material and by avoiding any possibility of short circuiting the electrically charged parts of the holder through the fastening elements for the casing of insulating material. This latter feature is also important from the standpoint of repairing the holder as it prevents any possibility of burning or welding the fastener elements in place in the event they are grounded during the welding operation. This oftentimes happens when using holders having metal fastener elements and frequently prevents dismantling the holder for repair purposes without considerable loss of time.

Another object of this invention is to provide an electrode holder having a casing of insulating material made in two halves and secured together in a manner to enable the same to be readily removed for repair or replacement purposes.

A further feature of this invention is to provide a holder having inserts for engaging the welding rod which are removable for replacement purposes. As a result, maximum efficiency of the holder may be maintained at a minimum cost and the life of the holder proper is greatly increased.

Still another object of this invention is to provide a holder wherein the welding rod is held in place by a spring so located and supported to prevent any possibility of electric current passing through the spring and annealing the same.

An additional feature of this invention is to prevent overheating of the holder by providing an air space between the inner surface of the insulating casing and parts of the holder enclosed by the casing.

With the foregoing as well as other objects in view, the invention resides in the novel construction of the holder which will be made more apparent as this description proceeds, especially when considered in connection with the accompanying drawing, wherein:

Figure 1 is a side elevational view of an electrode holder embodying the features of this invention;

Figure 2 is a longitudinal sectional view through the holder shown in Figure 1;

Figure 3 is a fragmentary bottom plane view of the welding rod receiving portion of the holder;

Figure 4 is a cross sectional view taken on the line 4—4 of Figure 2.

With the above in view, reference will now be made to the drawing wherein the reference character 10 designates a portable electrode holder of the general type employed in connection with arc welding equipment for removably holding an electrode in place. As shown particularly in Figure 2 of the drawing, the holder 10 comprises an elongated body 11 and an electrode clamp 12 slidably supported on the body. Both the body and clamp are formed of a material having good electrical conducting characteristics such, for example, as aluminum or some alloy of aluminum. Of course, other metals may be used but the foregoing materials are preferred because they not only possess good electrical conducting characteristics but are also light in weight.

The body 11 is bored at the rear end for receiving a terminal 13 fixed to one end of a flexible electric cable 14 having the opposite end (not shown) suitably equipped for connection with a source of welding current. The nose or front end of the body 11 is bifurcated and the furcations 15 are formed with flat adjacent surfaces for sliding contact with the clamp 12. The portion of the body intermediate the furcations 15 and the terminal receiving bore is formed with substantially aligned recesses 16 and 17 separated from each other by a partition 18 having a transverse slot 19 therethrough. The slot 19 is of sufficient dimension to receive and slidably support the clamp 12. The recess 16 is provided with a slot 20 in the top wall of sufficient dimension to receive the inner end of a trigger 21 pivotally supported intermediate its ends on suitable ears 22 projecting outwardly from the body 11 at opposite sides of the slot 20. The inner end portion of the trigger 21 is operatively connected to the electrode clamp 12 and the slot 20 is elongated in the direction of length of the body to enable manipulation of the trigger to effect a sliding movement of the clamp 12 relative to the body 11 of the holder 10.

Attention is now directed to the fact that each furcation 15 is provided with a readily removable insert 23 apertured to enable an electrode to be inserted therethrough. The aperture 23' through the insert in the lowermost furcation registers with two apertures 24 and 25 formed in the uppermost furcation. The axes of the apertures 23' and 25 are inclined rearwardly to enable supporting an electrode at an angle to the holder whereas, the axis of the aperture 24 is normal to the axis of the holder to enable supporting the electrode in a perpendicular position.

An electrode is held in either of the two positions previously referred to by the clamp 12 which is shown in Figure 2 of the drawing as having an elongated opening 26 registrable with both the apertures 24 and 25 as well as with the aperture 23'. The above registration of the apertures is effected by sliding the clamp 12 forwardly against the action of a spring 27 surrounding the portion of the clamp 12 in the recess 17 and having the rear end engaging an abutment 28 suitably fixed to the corresponding end of the clamp 12. The opposite end of the spring engages a similar abutment 29 slidably mounted on the clamp and engageable with the shoulder formed by the partition 18. Both abutments are preferably formed of a dielectric material to avoid leakage of welding current through the spring which is objectionable as it tends to anneal the spring.

With the above construction, it will be noted that the spring 27 is compressed when the clamp 12 is shifted forwardly to a position wherein the aperture 26 registers with the apertures in the furcations 15. The spring 27 is held in its compressed state by the operator until an electrode is positioned in either of the two positions noted whereupon, the operator releases the trigger 21 and permits the spring 27 to shift the clamp 12 rearwardly. As the clamp 12 shifts rearwardly under the action of the spring 27, it cooperates with the furcations 15 to secure the electrode in place.

When the holder 10 is in use, current passes from the electric conductor 14 through the body 11 and clamp 12 to the electrode. Continued use of the holder over long periods and under heavy current conditions tends to burn the metal of the holder surrounding the electrode. In the event the metal burns to an extent where efficient operation of the holder is impaired, the inserts 23 are merely removed and replaced at a relatively low cost with a new set.

It will also be noted from the drawing that the body 11 is completely insulated by a sectional dielectric casing 30. The front section 31 of the casing comprises an upper half 32 and a lower half 33 secured together by a fastener element in the form of a screw 34. The screw 34 is positioned forwardly beyond the current conducting parts of the holder so as to avoid any tendency for an arc to develop from the screw 34. The top half of the section 31 is fashioned to encase the ears 22 and the rear end of the section is tapered for connection with a corresponding taper on the front end of the rear section 35. The rear section 35 is also preferably grooved to provide a convenient grip and is readily removable from the front section 31. Also the two halves of the front section may be quickly dismantled with the result that repairs may be readily made when necessary. It is further pointed out at this time that the hand engaging portion of the trigger is also insulated so that maximum protection is afforded the operator during use of the holder.

In addition to the foregoing, it will be noted that provision is made to avoid overheating the holder during long periods of continuous operation. In the present instance, an air space 36 is provided between the insulation and the body. This space is obtained by forming button-like projections 37 on the body 11 of the holder 10 at points predetermined to adequately support the various sections of the insulation on the body and at the same time enable air to circulate within the casing of insulation around the body.

What we claim as our invention is:

1. An electrode holder comprising a body provided with a bifurcated end portion having registering openings through the furcations, removable inserts respectively supported in the furcations and having openings therethrough for receiving an electrode, a slide supported between the furcations for sliding movement relative thereto and having an opening therethrough registrable with the openings in the furcations to enable extending the electrode therethrough, and spring means normally urging the slide in a direction relative to the furcations to disalign the opening in the slide and the openings in the furcations.

2. An electrode holder comprising an elongated body provided with a bifurcated end portion having furcations with flat adjacent surfaces and having registering openings through the furcations for receiving a welding rod, a flat plate supported between the furcations for sliding movement lengthwise of the holder and having an opening therethrough registrable with the openings in the furcations to enable extending the welding rod therethrough, a coil spring housed in the body and acting on the plate for urging the latter in one direction relative to the furcations to disalign the opening through the plate and the openings through the furcations, means for insulating the spring from electrical contact with the plate and body, and an operating lever pivotally supported intermediate its ends on the body with one end conveniently located for engagement by the thumb of the operator and with the other end engaging the plate to move the latter in a direction against the action of the spring to align the opening through the plate with the opening in the furcations.

3. An electrode holder comprising a body bifurcated at one end and having a bore at the opposite end for removably receiving an electrical plug, a slide supported between the furcations for sliding movement relative thereto and having an opening therethrough registrable with openings in the furcations to enable a welding rod to be inserted into the openings, a spring housed in the body and acting on the slide for urging the latter in a direction to disalign the opening through the slide and the openings in the furcations, means for insulating the spring from electrical contact with both the plate and body, and a manually operable control member for moving the slide against the action of said spring to align the opening in the slide with the openings in the furcations.

ROBERT MUNRO.
ARTHUR A. ALBRIGHT.